United States Patent
Malvar et al.

(10) Patent No.: US 7,397,952 B2
(45) Date of Patent: *Jul. 8, 2008

(54) "DON'T CARE" PIXEL INTERPOLATION

(75) Inventors: Henrique S. Malvar, Sammamish, WA (US); Patrice Y. Simard, Bellevue, WA (US); James Russell Rinker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/286,622

(22) Filed: Nov. 23, 2005

(65) Prior Publication Data

US 2006/0083439 A1 Apr. 20, 2006

Related U.S. Application Data

(63) Continuation of application No. 10/180,800, filed on Jun. 26, 2002, now Pat. No. 7,043,079, which is a continuation-in-part of application No. 10/133,842, filed on Apr. 25, 2002, now Pat. No. 7,263,227, and a continuation-in-part of application No. 10/133,558, filed on Apr. 25, 2002, now Pat. No. 7,164,797, and a continuation-in-part of application No. 10/133,939, filed on Apr. 25, 2002.

(51) Int. Cl.
*G06K 9/46* (2006.01)

(52) U.S. Cl. .................. 382/195; 382/264; 382/283; 348/586; 358/448

(58) Field of Classification Search ............... 348/586, 348/587, 590, 571, 584, 598; 382/181, 190, 382/195, 199, 128, 162, 254, 266, 283, 284, 382/264; 358/448, 464

See application file for complete search history.

(56) References Cited

U.S. PATENT DOCUMENTS

| | | | |
|---|---|---|---|
| 3,606,546 A | 9/1971 | Dudley | |
| 3,719,922 A | 3/1973 | Lopes, Jr. et al. | |
| 3,882,454 A | 5/1975 | Marie et al. | |
| 4,606,069 A | 8/1986 | Johnson et al. | |
| 4,747,156 A | 5/1988 | Wahl | |
| 4,754,492 A | 6/1988 | Malvar | |
| 4,922,545 A | 5/1990 | Endoh et al. | |

(Continued)

FOREIGN PATENT DOCUMENTS

EP  0 567 344 A2  10/1993

(Continued)

OTHER PUBLICATIONS

U.S. Appl. No. 10/180,800, filed Jun. 26, 2002, Malvar et al.

(Continued)

*Primary Examiner*—Sheela C Chawan
(74) *Attorney, Agent, or Firm*—Amin, Turocy & Calvin, LLP

(57) ABSTRACT

A system and method facilitating image smoothing is provided. The invention includes an image processor having an image receptor and an image smoother. The invention provides for the image smoother to alter the value of a don't care pixel based, at least in part, upon a weighted average of care pixels.

19 Claims, 11 Drawing Sheets

U.S. PATENT DOCUMENTS

| | | | |
|---|---|---|---|
| 4,924,494 A | 5/1990 | Shung | |
| 5,077,807 A | 12/1991 | Bokser | |
| 5,129,014 A | 7/1992 | Bloomberg | |
| 5,304,991 A | 4/1994 | Motegi | |
| 5,402,146 A | 3/1995 | Rodriguez et al. | |
| 5,434,953 A | 7/1995 | Bloomberg | |
| 5,454,047 A | 9/1995 | Chang et al. | |
| 5,572,565 A | 11/1996 | Abdel-Mottaleb | |
| 5,572,604 A | 11/1996 | Simard | |
| 5,592,568 A | 1/1997 | Wilcox et al. | |
| 5,610,996 A | 3/1997 | Eller | |
| 5,689,585 A | 11/1997 | Bloomberg et al. | |
| 5,737,455 A * | 4/1998 | Harrington et al. | 382/284 |
| 5,754,183 A | 5/1998 | Berend et al. | |
| 5,778,092 A * | 7/1998 | MacLeod et al. | 382/176 |
| 5,790,696 A | 8/1998 | Takahashi | |
| 5,805,727 A | 9/1998 | Nakano | |
| 5,805,739 A | 9/1998 | Malvar et al. | |
| 5,828,771 A | 10/1998 | Bloomberg | |
| 5,883,986 A | 3/1999 | Kopec et al. | |
| 5,910,805 A | 6/1999 | Hickey et al. | |
| 5,914,748 A * | 6/1999 | Parulski et al. | 348/239 |
| 5,915,044 A * | 6/1999 | Gardos et al. | 382/236 |
| 5,917,951 A | 6/1999 | Thompson et al. | |
| 5,917,964 A | 6/1999 | Normile | |
| 5,923,380 A * | 7/1999 | Yang et al. | 348/586 |
| 5,930,377 A | 7/1999 | Powell et al. | |
| 5,960,111 A | 9/1999 | Chen et al. | |
| 5,960,119 A | 9/1999 | Echigo et al. | |
| 5,991,515 A | 11/1999 | Fall et al. | |
| 6,000,124 A | 12/1999 | Saito et al. | |
| 6,020,972 A | 2/2000 | Mahoney et al. | |
| 6,029,126 A | 2/2000 | Malvar | |
| 6,058,362 A | 5/2000 | Malvar | |
| 6,064,762 A | 5/2000 | Haenel | |
| 6,069,636 A | 5/2000 | Sayuda et al. | |
| 6,072,496 A | 6/2000 | Guenter et al. | |
| 6,073,153 A | 6/2000 | Malvar | |
| 6,094,506 A | 7/2000 | Hullender | |
| 6,100,825 A | 8/2000 | Sedluk et al. | |
| 6,108,444 A | 8/2000 | Syeda-Mahmood | |
| 6,108,446 A | 8/2000 | Hoshen | |
| 6,115,689 A | 9/2000 | Malvar | |
| 6,118,890 A | 9/2000 | Senior | |
| 6,137,908 A | 10/2000 | Rhee | |
| 6,144,767 A | 11/2000 | Bottou et al. | |
| 6,151,424 A | 11/2000 | Hsu | |
| 6,154,762 A | 11/2000 | Malvar | |
| 6,182,034 B1 | 1/2001 | Malvar | |
| 6,192,360 B1 | 2/2001 | Dumais et al. | |
| 6,233,364 B1 | 5/2001 | Krainiouk et al. | |
| 6,240,380 B1 | 5/2001 | Malvar | |
| 6,253,165 B1 | 6/2001 | Malvar | |
| 6,256,608 B1 | 7/2001 | Malvar | |
| 6,272,253 B1 | 8/2001 | Bannon et al. | |
| 6,285,801 B1 | 9/2001 | Mancuso et al. | |
| 6,295,371 B1 | 9/2001 | Rucklidge et al. | |
| 6,309,424 B1 | 10/2001 | Fallon | |
| 6,310,972 B1 | 10/2001 | Li et al. | |
| 6,321,243 B1 | 11/2001 | Ballard | |
| 6,324,560 B1 | 11/2001 | Malvar | |
| 6,326,977 B1 | 12/2001 | Westerman | |
| 6,334,001 B2 | 12/2001 | de Queiroz et al. | |
| 6,345,119 B1 | 2/2002 | Hotta et al. | |
| 6,411,733 B1 | 6/2002 | Saund | |
| 6,564,263 B1 | 5/2003 | Bergman et al. | |
| 6,633,670 B1 | 10/2003 | Matthews | |
| 6,658,151 B2 | 12/2003 | Lee et al. | |
| 6,731,800 B1 | 5/2004 | Barthel et al. | |
| 6,735,335 B1 | 5/2004 | Liu et al. | |
| 6,738,079 B1 | 5/2004 | Kellerman et al. | |
| 6,819,796 B2 | 11/2004 | Hong et al. | |
| 6,826,727 B1 | 11/2004 | Mohr et al. | |
| 6,901,153 B1 | 5/2005 | Leone | |
| 6,907,141 B1 | 6/2005 | Okamoto | |
| 6,941,014 B2 | 9/2005 | Lin et al. | |
| 6,977,664 B1 | 12/2005 | Jinzenji et al. | |
| 7,039,232 B2 | 5/2006 | Nagarajan et al. | |
| 2001/0004618 A1 | 6/2001 | Hur | |
| 2002/0064313 A1 | 5/2002 | Cheng | |
| 2003/0123729 A1 | 7/2003 | Mukherjee et al. | |
| 2003/0133615 A1 | 7/2003 | Bern et al. | |
| 2003/0198386 A1 | 10/2003 | Luo | |
| 2003/0229856 A1 | 12/2003 | Lynn et al. | |

FOREIGN PATENT DOCUMENTS

| | | |
|---|---|---|
| EP | 0 621 554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2 230 633 A | 10/1990 |
| JP | 60254871 | 12/1985 |
| JP | 63269267 | 11/1988 |
| JP | 03018986 | 1/1991 |
| JP | 04264687 | 9/1992 |
| JP | 06231307 | 8/1994 |
| JP | 08101893 | 4/1996 |
| JP | 10262155 | 9/1998 |
| JP | 2000013596 | 1/2000 |

OTHER PUBLICATIONS

U.S. Appl. No. 10/133,842, filed Apr. 25, 2002, Simard et al.
U.S. Appl. No. 10/133,558, filed Apr. 25, 2002, Simard et al.
U.S. Appl. No. 10/133,939, filed Apr. 25, 2002, Simard et al.
U.S. Appl. No. 10/180,649, filed Jun. 26, 2002, Simard et al.
U.S. Appl. No. 10/180,169, filed Jun. 26, 2002, Simard et al.
U.S. Appl. No. 10/180,771, filed Jun. 26, 2002, Simard et al.
U.S. Appl. No. 11/198,562, filed Aug. 5, 2005, Simard et al.
Debargha Mukherjee, et al.; "JPEG2000-Matched MRC Compression of Compound Documents"; Jun. 6, 2002.
Rangachar Kasturi, et al.; "Document Image Analysis: A Primer"; Sadhana vol. 27, Part 1, Feb. 2002, pp. 3-22.
Trevor Hastie, et al.; "Metrics and Models for Handwritten Character Recognition"; Dec. 8, 1997; pp. 1-18.
Leon Bottou, et al.; "High Quality Document Image Compression with DjVu"; Jul. 13, 1998; AT&T Labs.
European Search Report dated Sep. 15, 2005, mailed Sep. 30, 2005, for European Patent Application Serial No. EP 03 00 5429, 4 pages.
Witten, Ian H., et al; "Textual Image Compression", Data Compression Conference, IEEE, 10 pages, Mar. 24, 1992.
Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.
Salembier, et al. "Region-Based Representations of Image and Video: Segmentation Tools for Multimedia Serives" (Dec. 8, 1999) IEEE Transactions on Circuits and Systems for Video Technology, IEEE Inc. New York, pp. 1147-1169.
Haffner, et al. "Browsing through high quality document images with DjVu" Research and Technology Advances in Digital Libraries. ADL 1998 Proceedings (Apr. 22, 1998) IEEE International Forum in Santa Barabra, California, pp. 309-318.
Simard, et al. "A Wavelet Coder for Masked Images" Proceedings IEE Data Compression Conference (Mar. 27, 2001) Snowbird, Utah, pp. 93-102.
Simard, et al. "A Forefround/Background Separation Algorithm for Image Compression" (Mar. 23, 2004) Data Compression Conference, Snowbird, Utah, pp. 498-507.

European Search Report dated Oct. 4, 2005 mailed Oct. 13, 2005 for EP Application Serial No. 103005430, 5 pages.

Mukherjee, et al. "LPEG-Matched MRC Compression of Compound Documents" Proceedings 2001 International Conference of Image Processing (Oct. 7-10, 2001) Thessnlonki, Greece, pp. 434-437.

Cosman, et al. "Memory Efficient Quadiree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for EP Application Serial No. 03/005,431, 5 pages.

* cited by examiner

ORIGINAL

BINARY MASK

BACKGROUND

"DON'T CARE" PIXEL INTERPOLATION

CROSS-REFERENCE TO RELATED APPLICATIONS

This application is a continuation of U.S. patent application Ser. No. 10/180,800, filed on Jun. 26, 2002, now U.S. Pat. No. 7,043,079 entitled "DON'T CARE" PIXEL INTERPOLATION", which is a Continuation-in-Part of U.S. patent application Ser. No. 10/133,842, filed on Apr. 25, 2002, now U.S. Pat. No. 7,263,227 entitled "ACTIVITY DETECTOR", U.S. patent application Ser. No. 10/133,558, filed on Apr. 25, 2002, now U.S. Pat. No. 7,164,797 entitled "CLUSTERING", and U.S. patent application Ser. No. 10/133,939, filed on Apr. 25, 2002, entitled "LAYOUT ANALYSIS." This application is also related to co-pending U.S. patent application Ser. No. 10/180,649, filed on Jun. 26, 2002, entitled, "BLOCK RETOUCHING", co-pending U.S. patent application Ser. No. 10/180,169, filed on Jun. 26, 2002, entitled, "SEGMENTED LAYERED IMAGE SYSTEM", co-pending U.S. patent application Ser. No. 10/180,771, filed on Jun. 26, 2002, entitled, "SYSTEM AND METHOD FACILITATING DOCUMENT IMAGE COMPRESSION UTILIZING A MASK", and U.S. patent application Ser. No. 11/198,562, filed on Aug. 5, 2005, entitled, "CLUSTERING". The entireties of the aforementioned applications are incorporated herein by reference.

TECHNICAL FIELD

The present invention relates generally to document image processing, and more particularly to a system and method facilitating image interpolation or smoothing.

BACKGROUND

The amount of information available via computers has dramatically increased with the wide spread proliferation of computer networks, the Internet and digital storage means. With such increased amount of information has come the need to transmit information quickly and to store the information efficiently. Data compression is a technology that facilitates effectively transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed image can require 5 megabytes of space whereas the same image can be compressed and require only 2.5 megabytes of space. Thus, data compression facilitates transferring larger amounts information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data loss is tolerated. Lossless compression may be used, for example, when compressing critical text, because failure to reconstruct exactly the data can dramatically affect the quality and readability of text. Lossy compression can be used with images or non-critical text where a certain amount of distortion or noise is either acceptable or imperceptible to human senses. Data compression is especially applicable to digital representations of documents (digital documents). Typically, digital documents include text, images and/or text and images. In addition to using less storage space for current digital data, compact storage without significant degradation of quality would encourage digitization of current hardcopies of documents making paperless offices more feasible. Striving toward such paperless offices is a goal for many businesses because paperless offices provide benefits, such as allowing easy access to information, reducing environmental costs, reducing storage costs and the like. Furthermore, decreasing file sizes of digital documents through compression permits more efficient use of Internet bandwidth, thus allowing for faster transmission of more information and a reduction of network congestion. Reducing required storage for information, movement toward efficient paperless offices, and increasing Internet bandwidth efficiency are just some of many significant benefits associated with compression technology.

Compression of digital documents should satisfy certain goals in order to make use of digital documents more attractive. First, the compression should enable compressing and decompressing large amounts of information in a small amount of time. Secondly, the compression should provide for accurately reproducing the digital document.

One important aspect of compression of digital documents is compression of color bitmaps, for example, when an image of a document is generated by scanning a page of a printed catalog. A typical application is electronic archival of catalog pages, for example. Such pages usually contain a mixture of content, such as color picture, text on flat-color background or text superimposed on textures or pictures. Although any color picture bitmap compression technique such as JPEG can be used, better reconstruction quality can be obtained by segmenting the original image bitmap into layers and compressing each layer separately.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

As discussed previously, one important aspect of compression of digital documents is compression of color bitmaps, for example when an image of a document is generated by scanning a page of a printed catalog. A typical application is electronic archival of catalog pages, for example. Such pages usually contain a mixture of content, such as color picture, text on flat-color background or text superimposed on textures or pictures. Although any color picture bitmap compression technique such as JPEG can be used, better reconstruction quality can be obtained by segmenting the original image bitmap into layers and compressing each layer separately. For example, the image can be segmented into two layers: one containing mostly foreground colors such as those that fill text characters, and the second containing mostly background pictures and textures. A third layer, which can be referred to as the mask, is a binary image that indicates for each pixel to which layer it should belong, background or foreground. The mask can be compressed without loss, for example, by means of any binary image compression technique, such as those used for compressing fax images.

For example, for a bitmap that contains white letters superimposed on a picture background, a good segmentation would be to use a mask image whose value is "1" for pixels that are inside the letters, and "0" for pixels that correspond to the picture background. In that case, the foreground layer would have the color white everywhere, and the background layer would contain the picture, with holes (or cutouts) replacing the white letters.

Thus, compression via segmented layers can produce sharper reconstructed images, but it creates a new problem: compressing pictures with holes in them. Those holes are referred to as "don't care" pixels. In the example above, in the background layer the don't care pixels are those where the white letters used to be. These pixels are called "don't care" pixels because the decoder will replace them by the corresponding pixels in the foreground layer. The remaining pixels are the "care" pixels. Therefore, the compressor that processes the background layer can replace the "don't care" pixels by any value. In fact, it needs to replace the don't care pixels by some appropriate values, since it needs to know the value of very pixel, that is, it cannot compress pictures containing pixels with undefined values.

To minimize the bit rate required to compress a bitmap containing "don't care" pixels, a compressor should fill in the contents of such don't care pixels in such a way that they blend with the adjoining "care" pixels in the background. This is in fact a kind of interpolation problem, whose solution is the object of the invention. By applying the techniques of the present invention, the white letters of the example above can be filled in, generating a result in which the quality of the interpolation is very high; by looking at the interpolated picture one cannot easily tell what/where was the text that was originally superimposed. The interpolated picture is now ready for compression with any picture bitmap compression technique, such as JPEG.

In accordance with an aspect of the present invention, an image processor is adapted to receive an image input (e.g., based on a document to be archived and/or transmitted) is provided. For example, the image input can be a document image (e.g., a binary, RGB and/or YUV representation of document(s)). Alternatively, the image input can be a portion of a document image, for example, a background or a foreground. Additionally, the image processor receives a binary mask indicating, for example, whether each pixel of the image input belongs in the foreground and/or background. The boundary between a pixel care region and a pixel don't care region can have dramatic energy variance(s) which can be difficult for conventional encoder(s) to compress effectively. Accordingly, the image processor is adapted to smooth at least a portion of the image input, for example, to enable more effective data compression. By reducing these energy variance(s), more efficient compression can be achieved without substantial loss of data.

The image processor includes an image receptor adapted to receive an image comprising care pixels and don't care pixels. For example, identification of "care" pixels and "don't care" pixels can be based, at least in part, upon a binary mask. The image processor further includes an image smoother which is adapted to smooth the image. In accordance with an aspect of the present invention, effective compression of the background and/or the foreground can be achieved by replacing the "don't care" pixel(s) with pixel value(s) that allow for smoother transition(s) to the "care" pixels. The image smoother is further adapted to alter value(s) of don't care pixel(s), for example, based, at least in part, on a weighted average of "care" pixel(s).

Another aspect of the present invention provides for the image processor to include an optional image separator which receives the image and the binary mask as inputs. Based, at least in part, upon the binary mask, the image separator separates the image into a foreground and/or a background. The image separator can provide the foreground and/or the background to the image smoother for processing.

Yet another aspect of the present invention provides for a segmented layered image system (e.g., facilitating identification and/or compression of text, handwriting, drawings and the like) having an image processor including an image receptor and an image smoother, the segmented layered image system further including an image separator and a mask separator. The mask separator receives a document image (e.g., based on a document to be archived and/or transmitted). For example, the segmented layered image system can be part of a document compression system. The document image can be a binary, RGB and/or YUV representation of document(s). The mask separator component processes the document image and outputs a binary mask indicating whether each pixel of the document image belongs in the foreground and/or background. The binary mask can then be utilized by the image separator and/or the image processor.

Another aspect of the present invention provides for the image processor to be employed in a vast array of document image applications, including, but not limited to, photocopiers, document scanners, optical character recognition systems, personal digital assistants, fax machines, digital cameras and/or digital video cameras.

Other aspects of the present invention provide methods for smoothing an image, a computer readable medium having computer usable instructions for an image smoothing, a computer readable medium storing computer executable instructions operable to perform a method for smoothing an image and a data packet adapted to be transmitted between two or more computer processes comprising information associated with a smoothed image, the smoothed image comprising at least one altered don't care pixel, alteration being based, at least in part, on a weighted average of care pixels.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
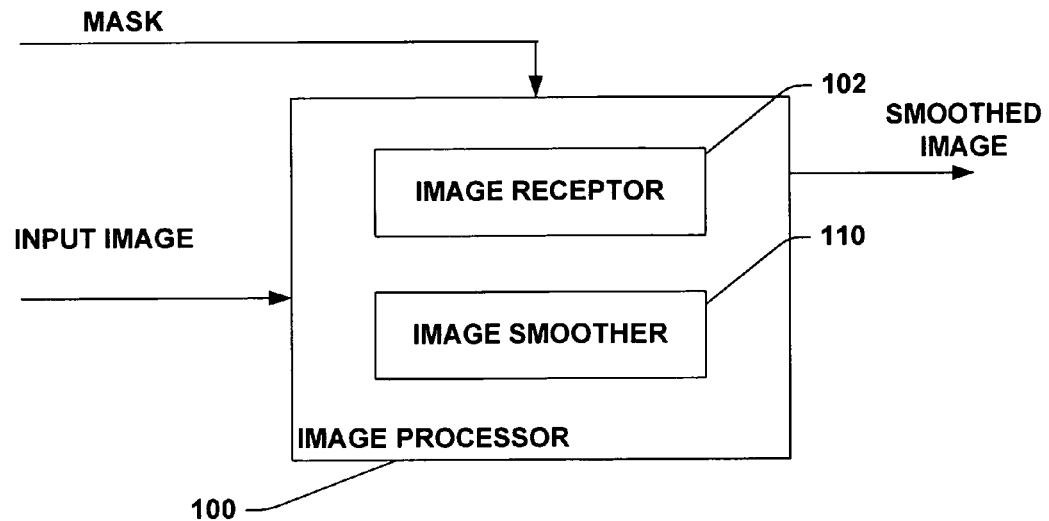
FIG. 1 is block diagram of an image processor in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, "document image" is intended to refer to a digital representation of document(s) comprising one or more color(s) (e.g., binary (e.g., black/white), gray-scale and/or color document(s)). Additionally, a document image can have image(s), text and/or text with images. A document image can be binary, RGB and/or YUV representations of document(s). An RGB document image is represented by red, green and blue components. A YUV document image is represented using a luminescence component denoted by Y and chrominance components denoted by U and V. Fewer bits can be used to represent the chrominance components U and V without significantly sacrificing visual quality of the YUV image. The YUV representation is, generally, a more compact and easy to use representation than an RGB representation. A document image comprises picture elements commonly referred to as "pixels". A document image can be based on single or multi-page document(s) of any shape or size.

Figure 2:
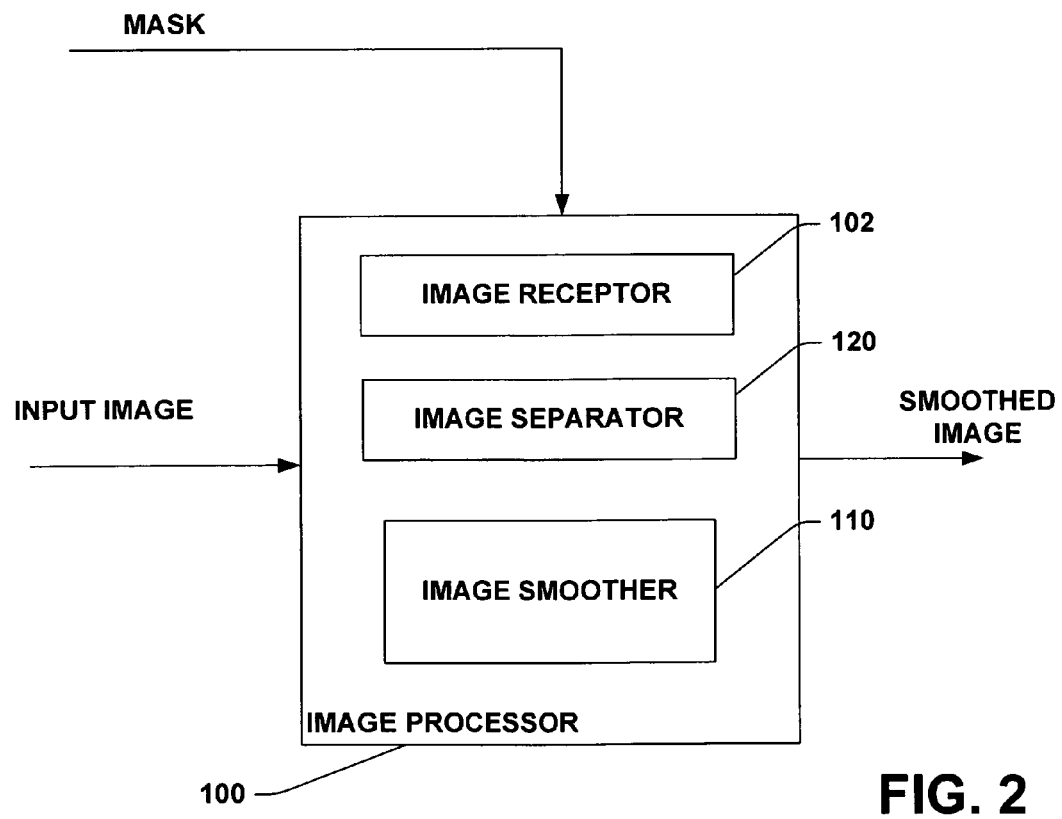
FIG. 2 is block diagram of an image processor in accordance with an aspect of the present invention.

Referring to FIG. 1, an image processor 100 in accordance with an aspect of the present invention is illustrated. The image processor 100 includes an image receptor 102 and an image smoother 110. As illustrated in FIG. 2, the image processor 100 can, optionally, include an image separator 120.

The image processor 100 receives an image input (e.g., based on a document to be archived and/or transmitted). For example, the image input can be a document image (e.g., a binary, RGB and/or YUV representation of document(s)). Alternatively, the image input can be a portion of a document image, for example, a background or a foreground. Additionally, the image processor 100 receives a binary mask indicating, for example, whether each pixel of the image input belongs in the foreground and/or background. The image processor 100 is adapted to smooth at least a portion of the image input, for example, to enable more effective data compression.

As discussed previously, one important aspect of compression of digital documents is compression of color bitmaps, for example when an image of a document is generated by scanning a page of a printed catalog. A typical application is electronic archival of catalog pages, for example. Such pages usually contain a mixture of content, such as color picture, text on flat-color background or text superimposed on textures or pictures. Although any color picture bitmap compression technique such as JPEG can be used, better reconstruction quality can be obtained by segmenting the original image bitmap into layers and compressing each layer separately. For example, the image can be segmented into two layers: one containing mostly foreground colors such as those that fill text characters, and the second containing mostly background pictures and textures. A third layer, which we refer to as the mask, is a binary image that indicates for each pixel to which layer it should belong, background or foreground. The mask can be compressed without loss, for example, by means of any binary image compression technique, such as those used for compressing fax images.

Figure 3:
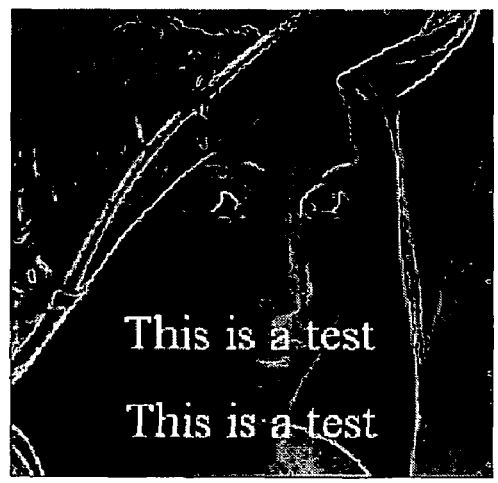
FIG. 3 is an exemplary bitmap in accordance with an aspect of the present invention.
Figure 4:
FIG. 4 is an exemplary smoothed image in accordance with an aspect of the present invention is illustrated.

For example, referring to FIG. 3, an exemplary bitmap that contains white letters superimposed on a picture background illustrated. A good segmentation would be to use a mask image whose value is "1" for pixels that are inside the letters, and "0" for pixels that correspond to the picture background. In that case, the foreground layer would have the color white everywhere, and the background layer would contain the picture, with holes (or cutouts) replacing the white letters.

Thus, compression via segmented layers can produce sharper reconstructed images, but it creates a new problem: compressing pictures with holes in them. Those holes are referred to as "don't care" pixels. In the example of FIG. 2, in the background layer the don't care pixels are those where the white letters used to be. Those pixels are called "don't care" pixels because the decoder will replace them by the corresponding pixels in the foreground layer. The remaining pixels are the "care" pixels. Therefore, the compressor that processes the background layer can replace the "don't care" pixels by any value. In fact, it needs to replace the don't care pixels by some appropriate values, since it needs to know the value of very pixel, that is, it cannot compress pictures containing pixels with undefined values.

To minimize the bit rate required to compress a bitmap containing "don't care" pixels, a compressor should fill in the contents of such don't care pixels in such a way that they blend with the adjoining "care" pixels in the background. This is in fact a kind of interpolation problem, whose solution is the object of the invention.

Referring briefly to FIG. 3, an exemplary smoothed image in accordance with an aspect of the present invention is illustrated. By applying the techniques of the present invention, the white letters of the bitmap of FIG. 2 can be filled in, generating the result of FIG. 3. The quality of the interpolation is very high; by looking at the interpolated picture one cannot easily tell what/where was the text that was originally superimposed. The interpolated picture is now ready for compression with any picture bitmap compression technique, such as JPEG.

Turning back to FIG. 1, the image receptor 102 is adapted to receive an image comprising care pixels and don't care pixels. For example, identification of care pixels and don't care pixels being based, at least in part, upon a binary mask. The image input can be a document image (e.g., a binary, RGB and/or YUV representation of document(s)). Alternatively, the image input can be a portion of a document image, for example, a background or a foreground. The image receptor 102 provides the image to the image smoother 110.

Figure 5:
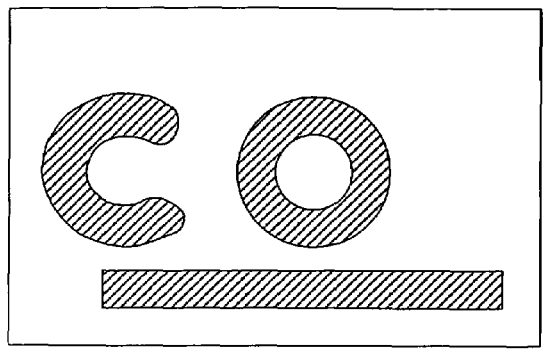
FIG. 5 is an exemplary document image in accordance with an aspect of the present invention.
Figure 6:
FIG. 6 is a mask associated with the exemplary document image of FIG. 5 in accordance with an aspect of the present invention.
Figure 7:
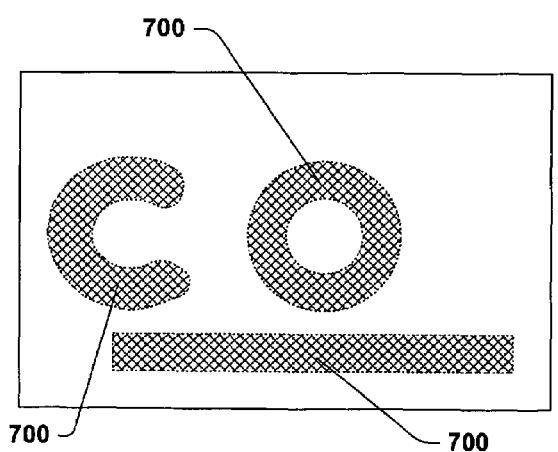
FIG. 7 is a background associated with the exemplary document image of FIG. 5 and the mask of FIG. 6 in accordance with an aspect of the present invention.

The image smoother 110 is adapted to smooth the image comprising care pixel(s) and don't care pixel(s). Turning briefly to FIG. 5, an exemplary document image is illustrated. The document image comprises the letters "C" and "O" along with a bar. FIG. 6 illustrates a mask associated with the exemplary document image of FIG. 5 in accordance with an aspect of the present invention. FIG. 7 illustrates a background associated with the exemplary document image of FIG. 5 and the mask of FIG. 6 in accordance with an aspect of the present invention. In the instance where the letters "C" and "O" and/or the bar are a constant color and/or have smooth color transition(s), effective compression of the foreground can be achieved using one of a variety of smoothing and/or compression technique(s). Further, pixels 700 within the dashed lines of FIG. 7 are "don't care" in the background since when the document image is reassembled the foreground will be placed over the background based, at least in part, upon reconstruction information stored in the mask. Thus, in accordance with the present invention, effective compression of the background can be achieved by replacing the "don't care" pixel(s) with pixel value(s) that allow for smoother transition(s). Further, "care pixel(s)" refers to pixel(s) of the image input alteration of which would compromise the integrity of the reconstructed image (e.g., reconstruction performed by an image decoder (not shown). For example, identification of care pixels and don't care pixels can be based, at least in part, upon a binary mask. The image smoother 110 is further adapted to alter value(s) of don't care pixel(s) based, at least in part, on a weighted average of care pixel(s).

Figure 8:
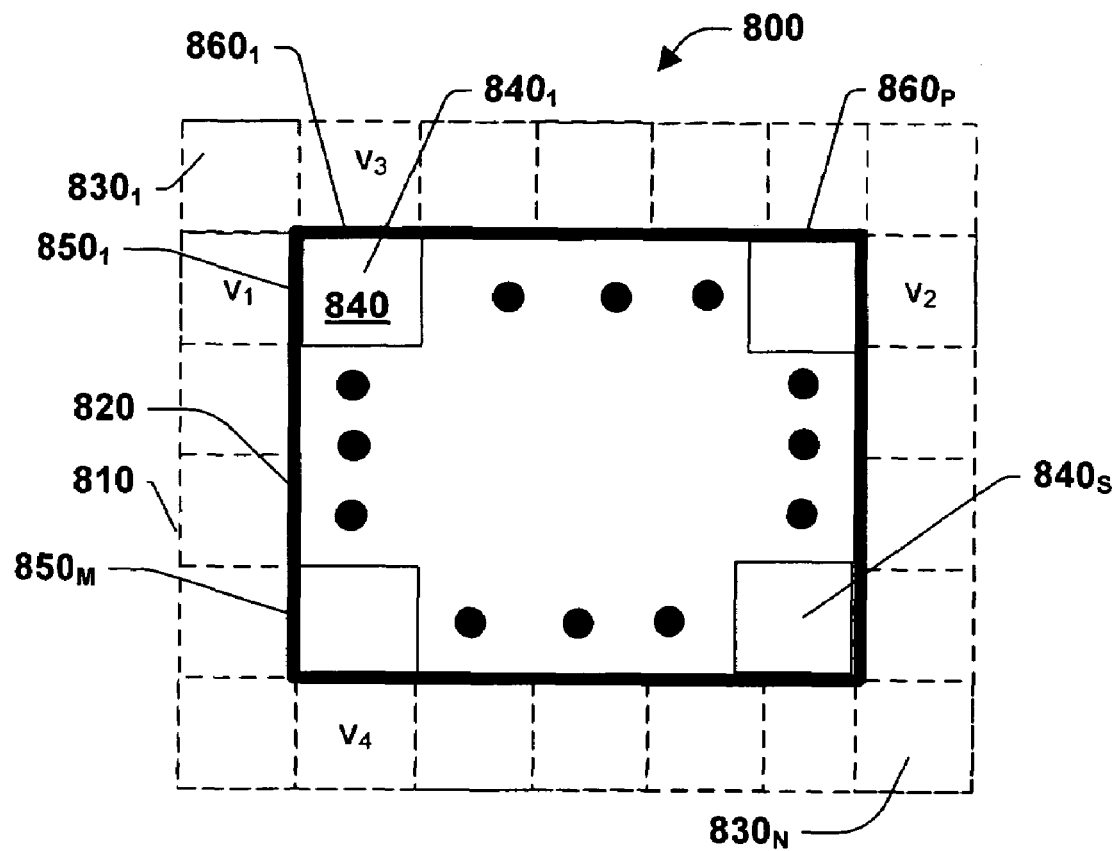
FIG. 8 is an exemplary region of an image in accordance with an aspect of the present invention.

Referring briefly to FIG. 8, an exemplary image 800 in accordance with an aspect of the present invention is illustrated. The image 800 includes a pixel care region 810 and a pixel don't care region 820. The pixel care region 810 includes a first care pixel $830_1$ through an Nth care pixel $830_N$, N being an integer greater to or equal to one. The first care pixel $830_1$ through the Nth care pixel $830_N$ can be referred to collectively as the care pixel(s) 830. For purposes of discussion, four care pixels 830 having respective values $v_1$, $v_2$, $v_3$ and $v_4$, are illustrated in FIG. 8. Further, while the pixel care region 810 and the pixel don't care region 820 are depicted in FIG. 8 as rectangles, it is to be appreciated that any suitable pixel care region 810 and/or pixel don't care region 820 can be utilized by the systems and methods of the present invention.

The pixel don't care region 820 includes a first don't care pixel $840_1$ through an Sth don't care pixel $840_S$, S being an integer greater to or equal to one. The first don't care pixel $840_1$ through the Sth don't care pixel $840_S$ can be referred to collectively as the don't care pixel(s) 840. The don't care pixel(s) 840 can be arranged in a first row $850_1$ through an Mth row $850_M$, M being an integer greater than or equal to one. Further the don't care pixel(s) 840 can be arranged in a first column $860_1$ through a Pth column $860_P$, P being an integer greater to or equal to one.

Typically, the boundary between the pixel care region 810 and the pixel don't care region 820 can result in dramatic energy variance(s) which can be difficult for conventional encoder(s) to compress effectively. By reducing these energy variance(s), more efficient compression can be achieved without substantial loss of data. In order to reduce (e.g., minimize) these energy variance(s), the values of the don't care pixel(s) 840 can be altered, for example, based, at least in part, on a weighted average of care pixel(s) 830.

In one example, a first row of the image 800 can be reviewed in a first direction (e.g., left to right) and a value ($v_1$) for the closest care pixel 830 and a corresponding distance ($d_1$) from the closest care pixel 830 can be stored for each don't care pixel 840. The first row of the image 800 can then be reviewed in a second direction (e.g., right to left) and a value ($v_2$) for a closest care pixel 830 and a corresponding distance ($d_2$) from the closest care pixel 830 can be stored for each don't care pixel 840. The image smoother 110 can proceed on a row-by-row basis until substantially the entire image 800 has been reviewed in the first and second direction.

Thereafter, a first column of the image 800 can be reviewed in a third direction (e.g., top to bottom) and a value ($v_3$) for the closest care pixel 830 and a corresponding distance ($d_3$) from the closest care pixel 830 can be stored for each don't care pixel 840. The first column of the image 800 can then be reviewed in a fourth direction (e.g., bottom to top) and a value ($v_4$) for a closest care pixel 830 and a corresponding distance ($d_4$) from the closest care pixel 830 can be stored for each don't care pixel 840. The image smoother 110 can proceed on a column-by-column basis until substantially the entire image 800 has been reviewed in the third and fourth direction.

The image smoother 110 can then calculate a value for each of the don't care pixel(s) 840 for example based, at least in part, upon the following equation:

$$v = \frac{v_1 e^{-d_1} + v_2 e^{-d_2} + v_3 e^{-d_3} + v_4 e^{-d_4}}{e^{-d_1} + e^{-d_2} + e^{-d_3} + e^{-d_4}} \quad (1)$$

which is a weighted average in which the weights depend exponentially on the distance between the target pixel v and each of the neighboring pixels $v_1$ to $v_4$. The image smoother 110 can then alter the value(s) of the don't care pixel(s) 840 with the calculated value(s). The image processor 100 can then provide the altered image as an output (e.g., to an encoder, not shown).

Referring back to FIG. 2, the optional image separator 120 receives the image from the image receptor 102. Additionally, the image separator 120 receives the binary mask as an input. Based, at least in part, upon the binary mask, the image separator 120 separates the image into a foreground and/or a background. The image separator 120 can provide the foreground and/or the background to the image smoother 110 for processing.

While FIG. 1 and FIG. 2 are block diagrams illustrating components for the image processor 100, it is to be appreciated that the image processor 100, the image receptor 102, the image smoother 110 and/or the image separator 120 can be implemented as one or more computer components, as that term is defined herein. Thus, it is to be appreciated that computer executable components operable to implement the image process 100, the image receptor 102, the image smoother 110 and/or the image separator 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 9:
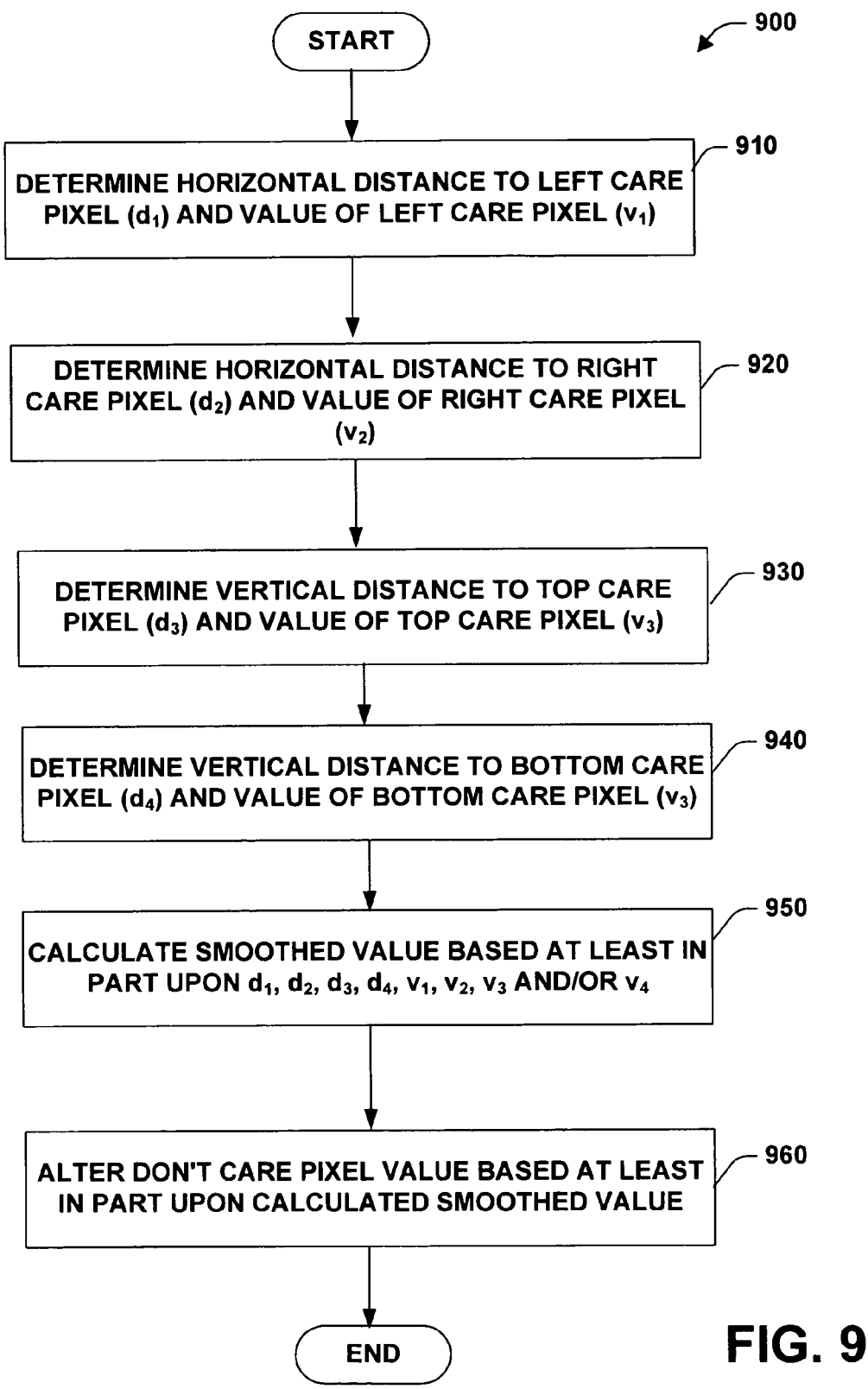
FIG. 9 is a flow chart illustrating a methodology for smoothing an image in accordance with an aspect of the present invention.
Figure 10:
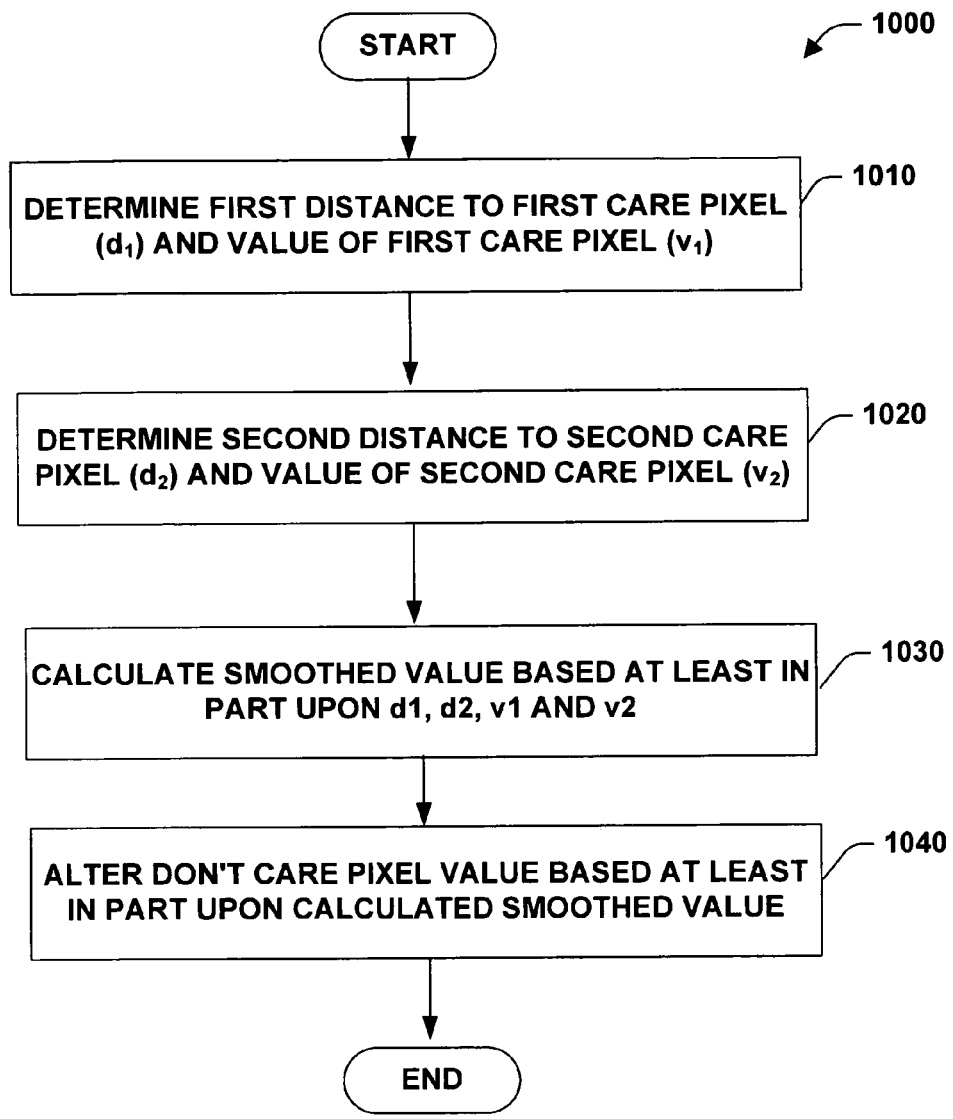
FIG. 10 is a flow chart illustrating a methodology for smoothing an image in accordance with an aspect of the present invention.
Figure 11:
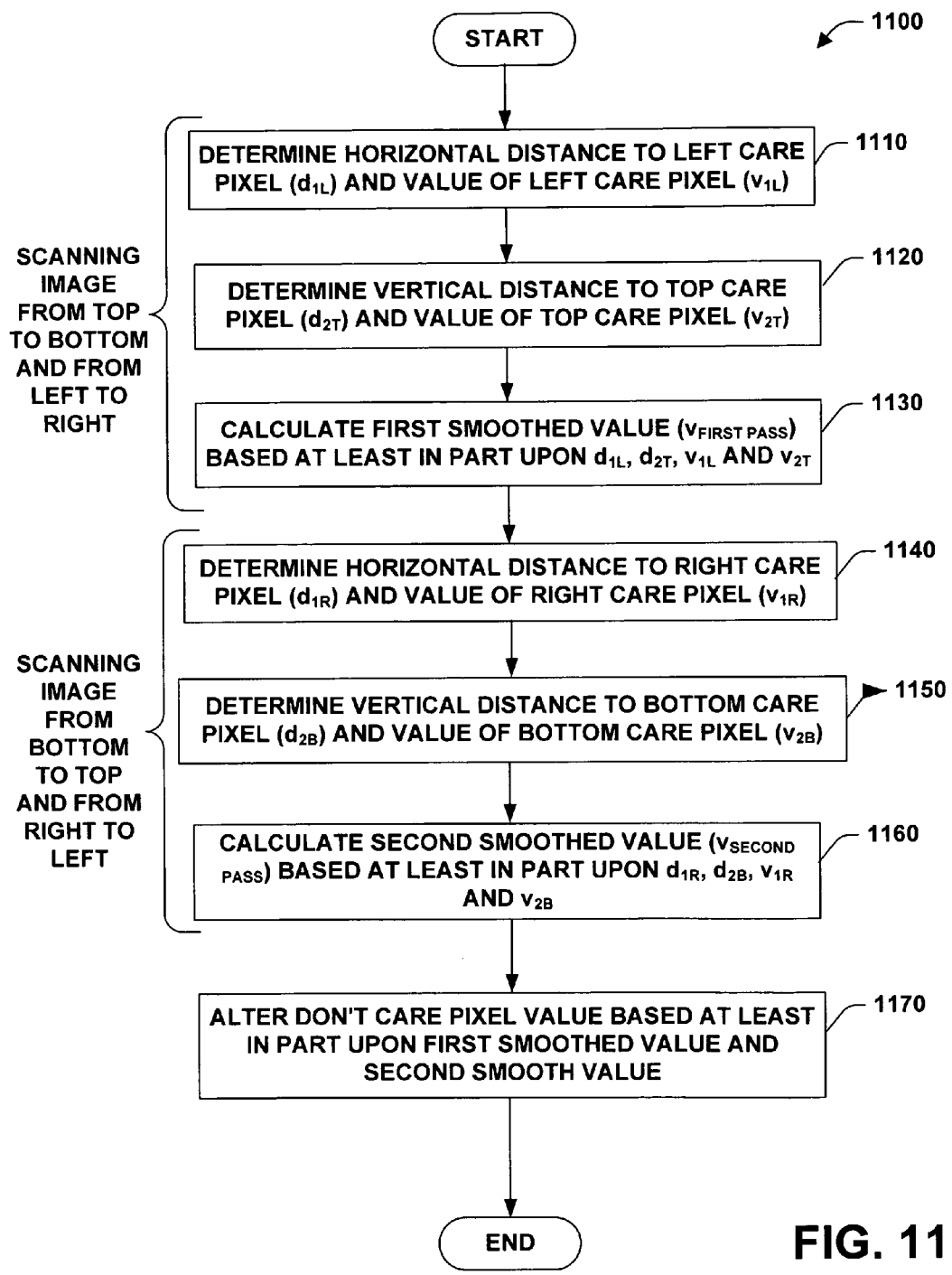
FIG. 11 is a flow chart illustrating a methodology for smoothing an image in accordance with an aspect of the present invention.

In view of the exemplary systems shown and described above, methodologies that may be implemented in accordance with the present invention will be better appreciated with reference to the flow charts of FIGS. 9, 10 and 11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 9, a methodology 900 for smoothing an image in accordance with an aspect of the present invention is illustrated. At 910, a horizontal distance $d_1$ to a left care pixel and a value $v_1$ of the left care pixel are determined for a don't care pixel. At 920, a horizontal distance $d_2$ to a right care pixel and a value $v_2$ of the right care pixel are determined for the don't care pixel. At 930, a vertical distance $d_3$ to a top care pixel and a value $v_3$ to the top care pixel are determined for the don't care pixel. Next, at 940, a vertical distance $d_4$ to a bottom care pixel and a value $v_4$ to the bottom care pixel are determined for the don't care pixel. At 950, a smoothed value for the don't care pixel is calculated based, at least in part, upon $d_1$, $d_2$, $d_3$, $d_4$, $v_1$, $v_2$, $v_3$ and/or $v_4$. For example, the smoothed value for the don't care pixel can be determined utilizing equation (1) set forth above. At 960, the don't care pixel value is altered based, at least in part, upon the calculated smoothed value. It is to be appreciated that the blocks of the methodology 900 can be performed for one or substantially all of the don't care pixel(s).

Referring next to FIG. 10, a methodology 1000 for smoothing an image in accordance with an aspect of the present invention is illustrated. At 1010, a first distance $d_1$ to a first care pixel and a value $v_1$ of the first care pixel are determined for a don't care pixel. At 1020, a second distance $d_2$ to a second care pixel and a value $v_2$ of the second care pixel are determined for the don't care pixel. At 1030, a smoothed value for the don't care pixel is calculated based, at least in part, upon $d_1$, $d_2$, $v_1$, and $v_2$. For example, the smoothed value for the don't care pixel can be determined utilizing the following equation:

$$v = \frac{v_1 e^{-d_1} + v_2 e^{-d_2}}{e^{-d_1} + e^{-d_2}} \quad (2)$$

At 1040, the don't care pixel value is altered based, at least in part, upon the calculated smoothed value. It is to be appreciated that the blocks of the methodology 1000 can be performed for one or substantially all of the don't care pixel(s).

Turning to FIG. 11, a methodology 1100 for smoothing an image in accordance with an aspect of the present invention is illustrated. At 1110, a horizontal distance to a left care pixel ($d_{1L}$) and a value of the left care pixel ($v_{1L}$) is determined. At 1120, a vertical distance to a top care pixel ($d_{2T}$) and a value of the top care pixel ($v_{2T}$) is determined. Next, at 1130, a first smoothed value ($v_{FIRST PASS}$) based, at least in part, upon $d_{1L}$, $v_{1L}$, $d_{2T}$ and $v_{2T}$ is calculated (e.g., each "don't care" pixel v is smoothed according to Equation (2), where $v_1$ and $v_2$ are the nearest left and top "care" pixels, respectively). That produces a first smoothed image, in which smoothness across left and top boundaries is ensured.

Then the pixels of this first smoothed image are scanned by row, but from bottom to top, and each row is processed from right to left. At 1140, a horizontal distance to a right care pixel ($d_{1R}$) and a value of the right care pixel ($v_{1R}$) is determined. At 1150, a vertical distance to a bottom care pixel ($d_{2B}$) and a value of the bottom care pixel ($v_{2B}$) is determined. Next, at 1160, a second smoothed value ($v_{SECOND PASS}$) based, at least in part, upon $d_{1R}$, $v_{1R}$, $d_{2B}$ and $v_{2B}$ is calculated (e.g., smoothed pixel values are again computed according to Equation (2), where $v_1$ and $v_2$ are now the nearest right and bottom "care" pixels, respectively). At 1170, a final value of v ($v_{FINAL}$) is then determined by based at least in part upon the first smoothed value and the second smoothed value, for example, employing an additional weighting:

$$v_{FINAL} = \frac{v_{FIRST PASS} w(d_{1L}, d_{2T}) + v_{SECOND PASS} w(d_{1R}, d_{2B})}{w(d_{1L}, d_{2T}) + w(d_{1R}, d_{2B})} \quad (3)$$

where the weights $w(d_{1L}, d_{2T})$ depends on the distances computed in the first pass (from left and top "care" neighbors, respectively), and $w(d_{1R}, d_{2B})$ depends on the distances computed in the second pass (from right and bottom "care" neighbors, respectively). In an exemplary implementation, the weights $w(d_1, d_2)$ can be computed in a manner that approximates the effects of the original weights of Equation (1), for example, $$w(d_1, d_2) = e^{-min(d_1, d_2)} \quad (4)$$

It is to be appreciated that the other weighting formulas that approximate those described in Equations (1)-(4) can be easily designed by one skilled in the art, and, all such types of weight formulas are intended to fall within the scope of the hereto appended claims. Thus, the scope of the present invention is intended to encompass such variations, and not to be limited to the specific formulas as described above. For example, in some applications it may be desired to limit the values of the distances and/or the weights to some adjustable thresholds, to improve visual performance in terms of amount of the perceived blurriness introduced by the processing.

Figure 12:
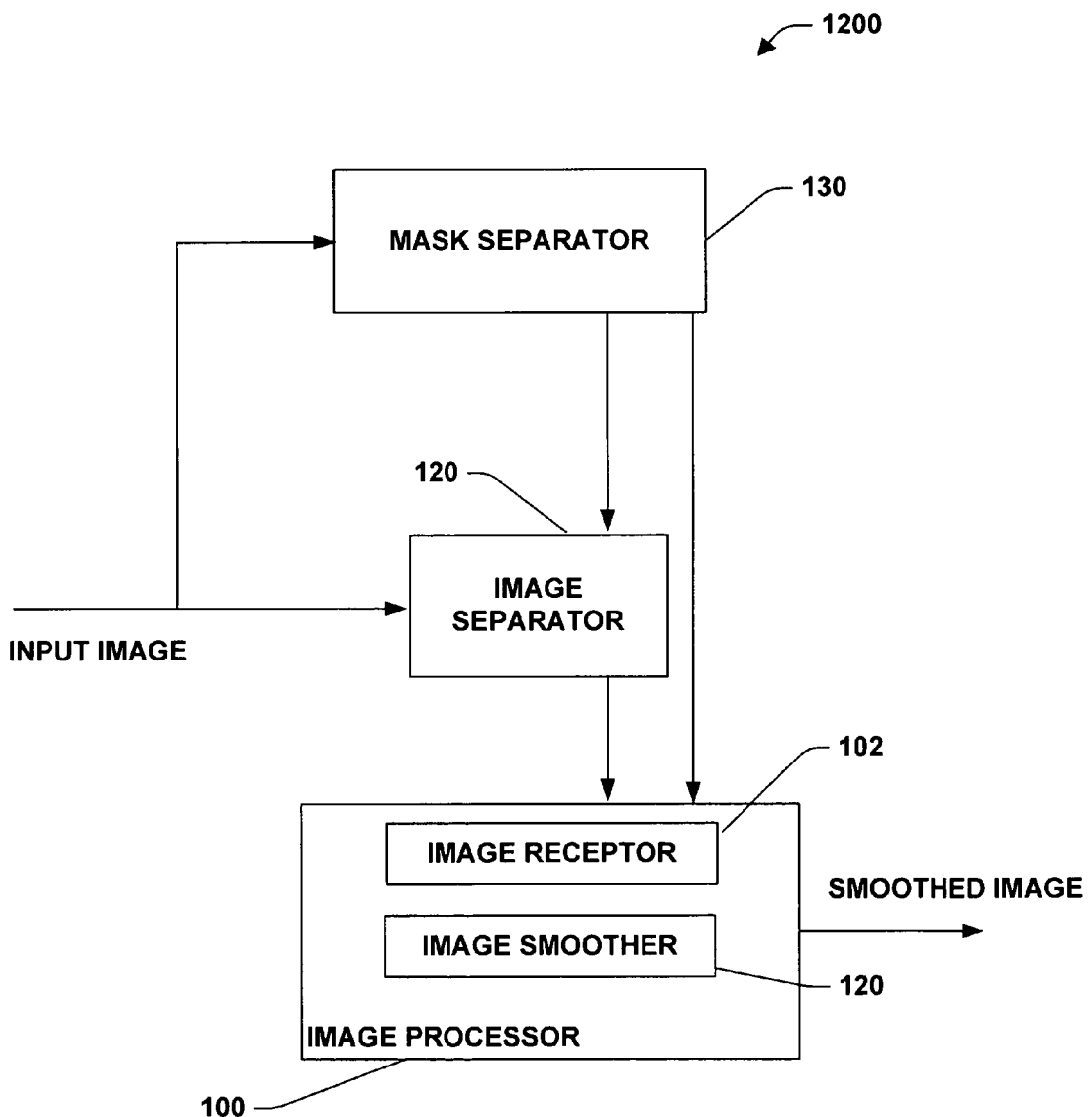
FIG. 12 is a block diagram of a segmented layered image system in accordance with an aspect of the present invention.

Turning next to FIG. 12, a segmented layered image system 1200 in accordance with an aspect of the present invention is illustrated. The segmented layered image system 1200 includes an image processor 100 having an image receptor 102 and an image smoother 110. The segmented layered image system 1200 further includes an image separator 120 and a mask separator 130.

The mask separator 130 receives a document image (e.g., based on a document to be archived and/or transmitted). For example, the segmented layered image system 1200 can be part of a document compression system (not shown). The document image can be a binary, RGB and/or YUV representation of document(s). The mask separator component 130 processes the document image and outputs a mask (e.g., binary) indicating whether each pixel of the document image belongs in the foreground and/or background. The mask can then be utilized by the image separator 120 and/or the image processor 100. It is to be appreciated that the mask separator component 130 can be a computer component as that term is defined herein.

Figure 13:
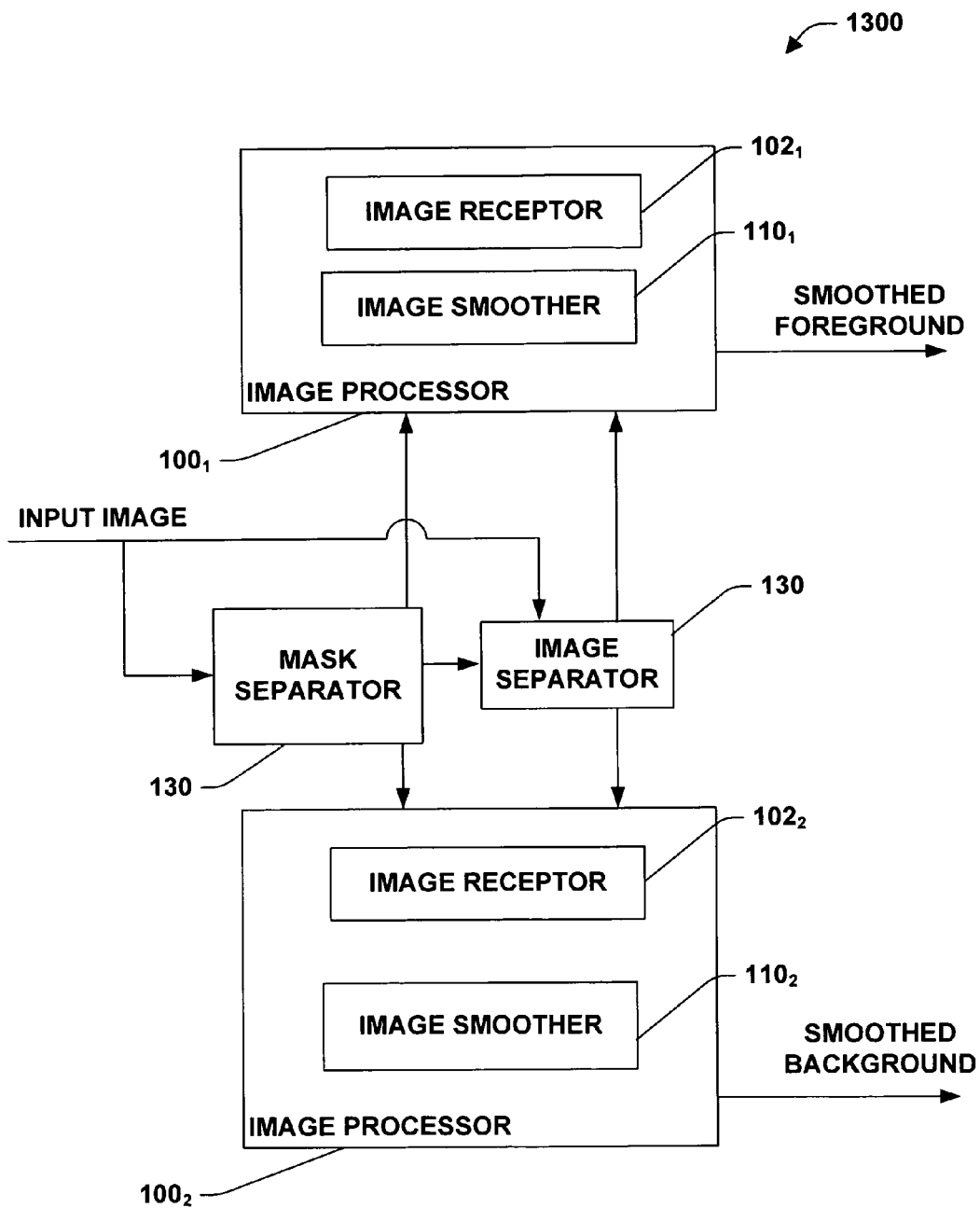
FIG. 13 is a block diagram of a segmented layered image system in accordance with an aspect of the present invention.

Referring next to FIG. 13, a segmented layered image system 1300 in accordance with an aspect of the present invention is illustrated. The segmented layered image system 1300 includes a first image processor $100_1$ having an image receptor $102_1$ and an image smoother $110_1$ and a second image processor $100_2$ having an image receptor $102_2$ and an image smoother $110_2$. The segmented layered image system 1300 further includes an image separator 120 and a mask separator 130.

The mask separator 130 processes a document image and provides a binary mask indicating whether each pixel of the document image belongs in the foreground and/or background.

The image separator 120 receives the document image and the binary mask as inputs. Based, at least in part, upon the binary mask, the image separator 120 separates the image into a foreground and/or a background. The image separator 120 can then provide the foreground to the image receptor $102_1$ of the first image processor $110_1$ and/or the background to the image receptor $102_2$ of the second image processor $110_2$.

The first image processor $110_1$ can receive the foreground from the image separator 120 and the binary mask as inputs. The first image processor $110_1$ can provide a smoothed foreground as an output having at least one altered don't care pixel. The altered don't care pixel can be based, at least in part, upon a weighted average of care pixels. For example, the first image processor $110_1$ can utilize equation (1) or equation (2) set forth above. The smoothed foreground can be encoded by an encoder (not shown).

Similarly, the second image processor $110_2$ can receive the background from the image separator 120 and the binary mask as inputs. The second image processor $110_2$ can provide a smoothed background as an output having at least one altered don't care pixel. The altered don't care pixel can be based, at least in part, upon a weighted average of care pixels. For example, the second image processor $110_2$ can utilize equation (1) or equation (2) set forth above. The smoothed background can be encoded by an encoder (not shown).

While the image separator 120 is illustrated as a separate component, it is to be appreciated that the image separator 120 can be a component of the first image processor $100_1$ and/or the second image processor $100_2$.

It is to be appreciated that the system and/or method of the present invention can be utilized in an overall segmented layered image system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras and/or digital video cameras.

Figure 14:
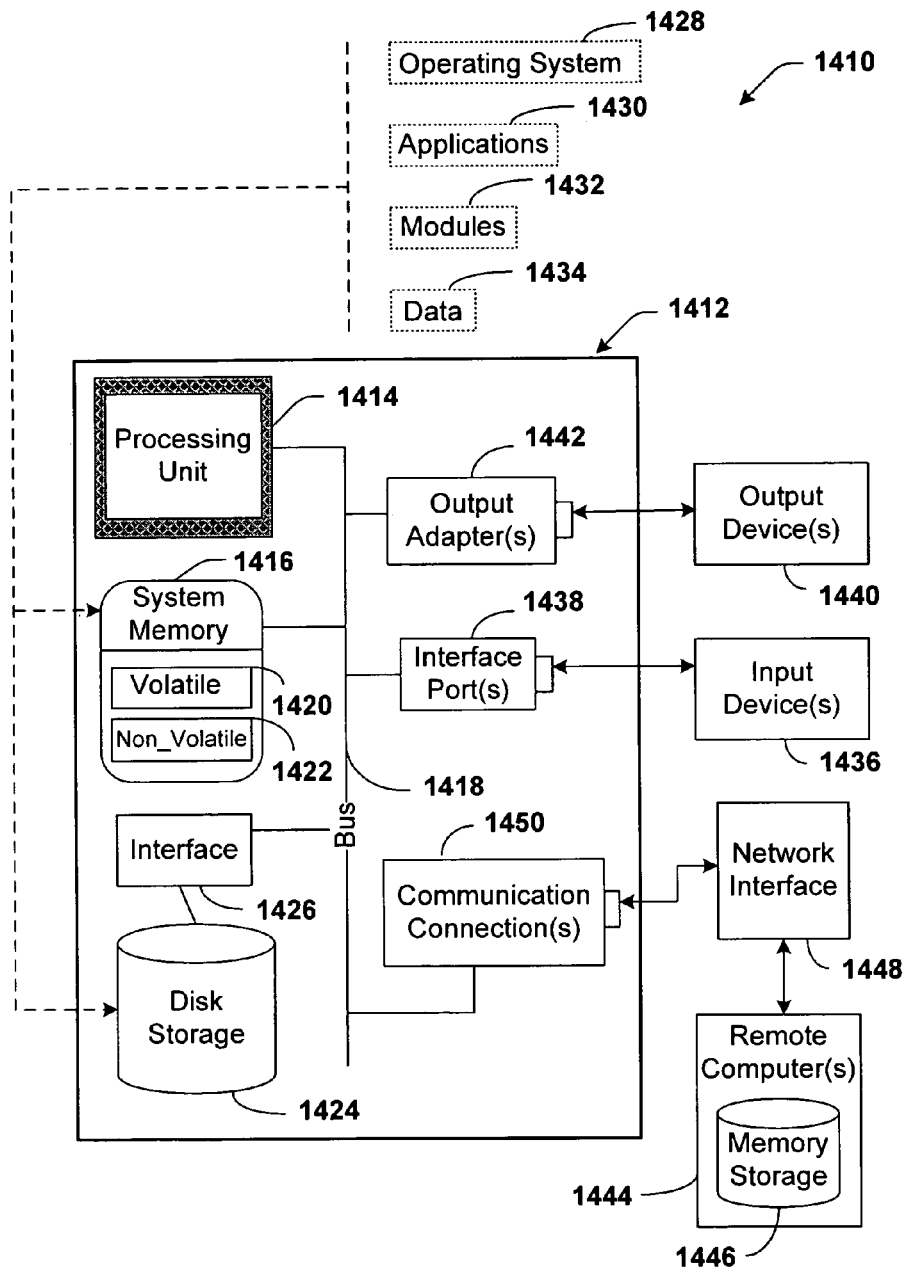
FIG. 14 illustrates an example operating environment in which the present invention may function.
Figure 15:
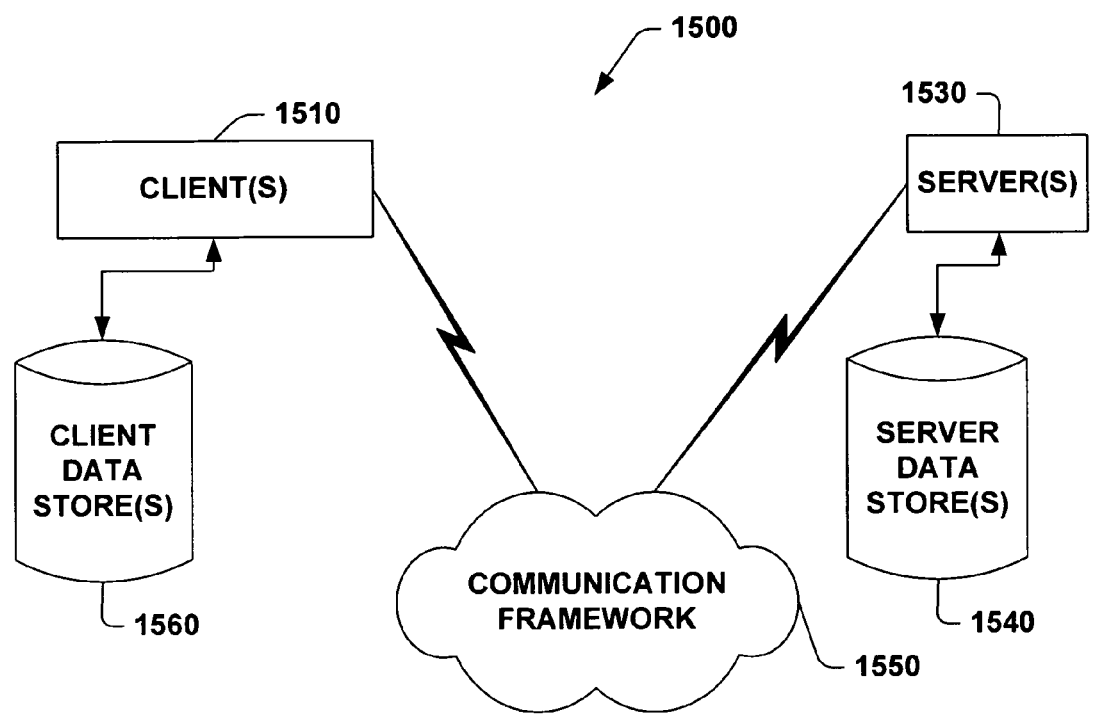
FIG. 15 is a schematic block diagram of an exemplary communication environment in accordance with the present invention.

In order to provide additional context for various aspects of the present invention, FIG. 14 and the following discussion are intended to provide a brief, general description of a suitable operating environment 1410 in which various aspects of the present invention may be implemented. FIG. 15 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 14-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jazz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1416 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1402.3, Token Ring/IEEE 1402.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The server(s) 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the server(s) 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An image processor, comprising:
   an image receptor to receive an image, the image comprising care pixels and don't care pixels, identification of care pixels and don't care pixels being based, at least in part, upon a binary mask; and
   an image smoother to smooth the image by altering a value of at least one don't care pixel based, at least in part, on a weighted average of care pixels;
   wherein altering a value of at least one don't care pixel based, at least in part, on a weighted average of care pixels comprises:

determining a first distance to a first care pixel and a first value of the first care pixel;

determining a second distance to a second care pixel and a second value of the second care pixel;

calculating a smoothed value for a don't care pixel based, at least in part, upon a weighted average of the first distance, the first value, the second distance and the second value, wherein calculation of the smoothed value of the don't care pixel is based, at least in part, upon the equation:

$$v = \frac{v_1 e^{-d_1} + v_2 e^{-d_2}}{e^{-d_1} + e^{-d_2}}$$

where v is the smoothed value of the don't care pixel,
$v_1$ is the first value,
$v_2$ is the second value,
$d_1$ is the first distance, and
$d_2$ is the second distance; and
altering the value of the don't care pixel based, at least in part, upon the calculated smoothed value.

2. The image processor of claim 1, further comprising an image separator to separate the image into at least one of a background and a foreground.

3. The image processor of claim 2, the binary mask being based, at least in part, upon a partition of the document image based, at least in part, upon minimization of pixel energy of at least one of the foreground and the background.

4. The image processor of claim 2, wherein the image separator stores separation information in the binary mask.

5. The image processor of claim 1, the image smoother providing an output having at least one altered don't care pixel.

6. The image processor of claim 1, wherein a photocopier employs the image processor.

7. The image processor of claim 1, wherein a document scanner employs the image processor.

8. The image processor of claim 1, wherein an optical character recognition system employs the image processor.

9. The image processor of claim 1, wherein a personal digital assistant employs the image processor.

10. The image processor of claim 1, wherein a fax machine employs the image processor.

11. The image processor of claim 1, wherein a digital camera employs the image processor.

12. The image processor of claim 1, wherein a digital video camera employs the image processor.

13. The image processor of claim 1, wherein a segmented layered image system employs the image processor.

14. The image processor of claim 1, wherein information is transmitted between the image receptor and the image smoother by a data packet stored on computer-readable media.

15. The image processor of claim 1, wherein the image receptor and the image smoother are stored on computer-readable media.

16. The image processor of claim 1, wherein the image processor is employed in a networked environment.

17. The image processor of claim 16, wherein the networked environment is the Internet.

18. A method for smoothing an image, the method implemented by computer-executable instructions stored on computer-readable media, the method comprising:

scanning the image from top to bottom and from left to right;

determining a horizontal distance to a left care pixel and a value of the left care pixel;

determining a horizontal distance to a right care pixel and a value of the right care pixel;

determining a vertical distance to a top care pixel and a value of the top care pixel;

determining a vertical distance to a bottom care pixel and a value of the bottom care pixel;

calculating a smoothed value for a don't care pixel based, at least in part, upon at least one of the horizontal distance to the left care pixel, the value of the left care pixel, the horizontal distance to the right care pixel, the value of the right care pixel, the vertical distance to the top care pixel, the value of the top care pixel, the vertical distance to the bottom care pixel and the value of the bottom care pixel;

scanning the image from bottom to top and from right to left;

determining a horizontal distance to a right care pixel and a value of the right care pixel;

determining a vertical distance to a bottom care pixel and a value of the bottom care pixel;

calculating a second smoothed value for the don't care pixel based, at least in part, upon at least one of the horizontal distance to the right care pixel, the value of the right care pixel, the vertical distance to the bottom care pixel and the value of the bottom care pixel, and altering of the don't care pixel value being based, at least in part, upon the equation:

$$v_{FINAL} = \frac{v_{FIRST\ PASS} w(d_{1L}, d_{2T}) + v_{SECOND\ PASS} w(d_{1R}, d_{2B})}{w(d_{1L}, d_{2T}) + w(d_{1R}, d_{2B})}$$

where $v_{FINAL}$ is the smoothed value of the don't care pixel,
$v_{FIRST\ PASS}$ is the first smoothed value,
$v_{SECOND\ PASS}$ is the second smoothed value,
$d_{1L}$ is the horizontal distance to the left care pixel,
$d_{2T}$ is the vertical distance to the top care pixel,
$w(d_{1L}, d_{2T})$ is a weight factor computed from the horizontal distance to the left care pixel and the vertical distance to the top care pixel,
$d_{1R}$ is the horizontal distance to the right care pixel,
$d_{2B}$ is the vertical distance to the bottom care pixel, and
$w(d_{1R}, d_{2B})$ is a weight factor computed from the two horizontal distance to the right care pixel and the vertical distance to the bottom care pixel.

19. An image processor, comprising:

means for determining a first distance to a first care pixel and a first value of the first care pixel;

means for determining a second distance to a second care pixel and a second value of the second care pixel;

means for calculating a smoothed value for a don't care pixel based, at least in part, upon a weighted average of the first distance, the first value, the second distance and the second value; and means for altering the value of the don't care pixel based, at least in part, upon the calculated smoothed value and the equation:

$$v = \frac{v_1 e^{-d_1} + v_2 e^{-d_2} + v_3 e^{-d_3} + v_4 e^{-d_4}}{e^{-d_1} + e^{-d_2} + e^{-d_3} + e^{-d_4}}$$

where v is the smoothed value of the at least one don't care pixel,
$v_1$ is the value of a first care pixel,
$v_2$ is the value of a second care pixel, $v_3$ is the value of a third care pixel, $v_4$ is the value of a fourth care pixel, $d_1$ is the distance from the at least one don't care pixel to the first care pixel, $d_2$ is the distance from the at least one don't care pixel to the second care pixel, $d_3$ is the distance from the at least one don't care pixel to the third care pixel, $d_4$ is the distance from the at least one don't care pixel to the fourth care pixel, for alteration of the at least one don't care pixel.

* * * * *